United States Patent [19]

Barrientos

[11] 4,118,081

[45] Oct. 3, 1978

[54] PLATE HOLDER

[76] Inventor: Christine Ann Barrientos, 996 Hamilton Ave., Seaside, Calif. 93955

[21] Appl. No.: 775,835

[22] Filed: Mar. 9, 1977

[51] Int. Cl.² ............................................. A47B 81/00
[52] U.S. Cl. ............................................ 312/8; 312/9; 312/213; 206/499; 211/41; 211/495; 220/19
[58] Field of Search ................. 312/8, 9, 270, 213; 206/499, 500; 220/19; 211/41, 49 S

[56] References Cited

U.S. PATENT DOCUMENTS

| | | | |
|---|---|---|---|
| 369,112 | 8/1887 | Jory | 206/499 X |
| 2,172,013 | 9/1939 | Parry | 211/49 S |
| 2,261,806 | 10/1941 | Hills | 312/9 |
| 2,544,053 | 3/1951 | Sharaf | 211/41 R |
| 2,892,562 | 6/1959 | Smithson | 220/19 |
| 2,893,550 | 7/1959 | Sandmeyer | 206/499 |
| 2,928,200 | 3/1960 | Shiels | 211/49 S |
| 2,939,586 | 6/1960 | Dumaine | 211/41 R |
| 3,168,229 | 2/1965 | Heifetz | 211/41 R |
| 3,461,842 | 8/1969 | Conrad et al. | 211/41 R |
| 3,732,976 | 5/1973 | Bessett et al. | 206/499 X |

*Primary Examiner*—Kenneth Downey
*Assistant Examiner*—Victor N. Sakran
*Attorney, Agent, or Firm*—Brady, O'Boyle & Gates

[57] ABSTRACT

A plate holder for use in leisure time vehicles such as campers, trailers, and the like, the holder having a plurality of carriers mounted in stacked relationship within a housing, each carrier being constructed and arranged to support a plate, whereby the stacked plates are protected against damage while the vehicle is moving.

7 Claims, 4 Drawing Figures

PLATE HOLDER

BACKGROUND OF THE INVENTION

In today's world of leisure time living, it is customary to equip the vehicle employed therein with all the necessary accouterments; such as, cookware, eating utensils, dishes, and the like. Due to the mobility of these vehicles, at times over rough terrain, the proper storage of the accouterments to prevent damage thereto has been a constant concern to many travelers and campers.

After considerable research and experimentation, the holder of the present invention has been devised to prevent damage to food plates while stored in a moving vehicle. The plate holder of the present invention comprises, essentially, a plurality of soft plastic carriers slidably mounted on a support disposed within a protective housing. A plurality of plates are interleaved the plastic carriers so that the bottom surface of each plate is supported by a carrier and the top surface of each plate has the next adjacent carrier resting thereon.

DESCRIPTION OF THE PREFERRED EMBODIMENTS

Figure 1:
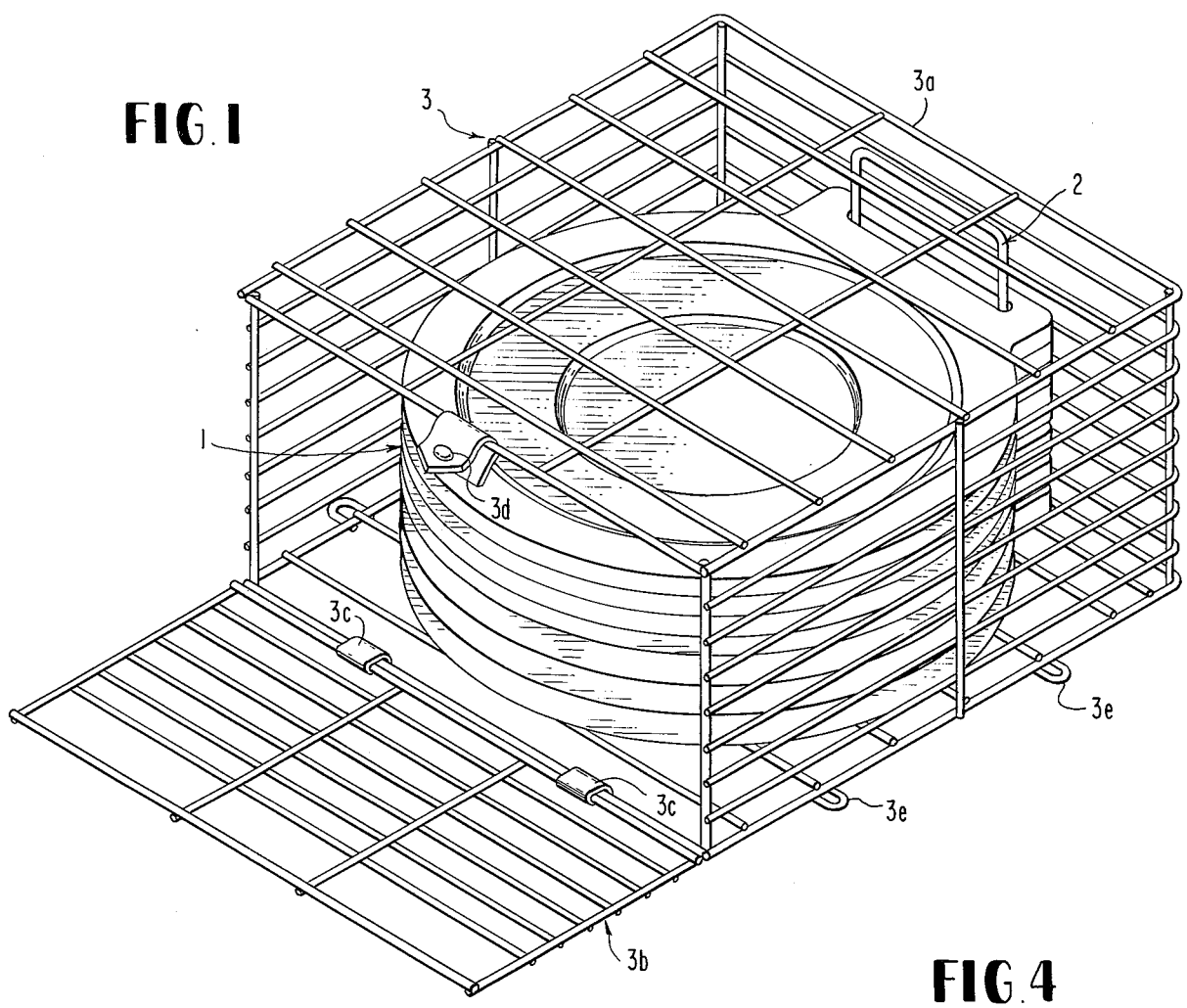
FIG. 1 is a perspective view of the plate holder of the present invention without any plate positioned therein.
Figure 4:
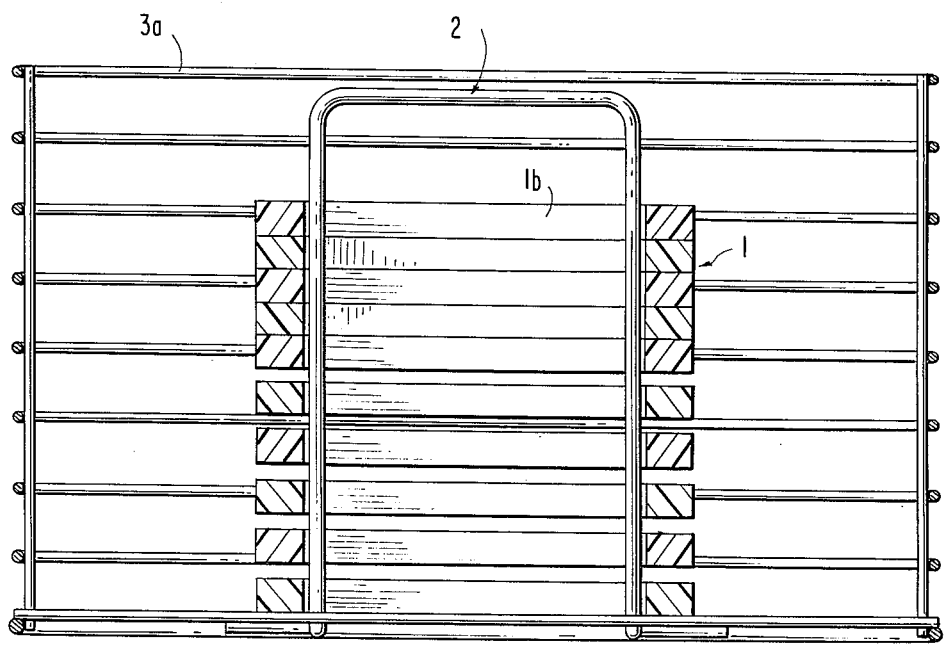
FIG. 4 is a view taken aong line 4—4 of FIG. 3.

Referring to the drawings and more particularly to FIG. 1 thereof, the holder of the present invention comprises a plurality of carriers 1 slidably mounted on a support 2 disposed within a protective housing 3.

Figure 3:
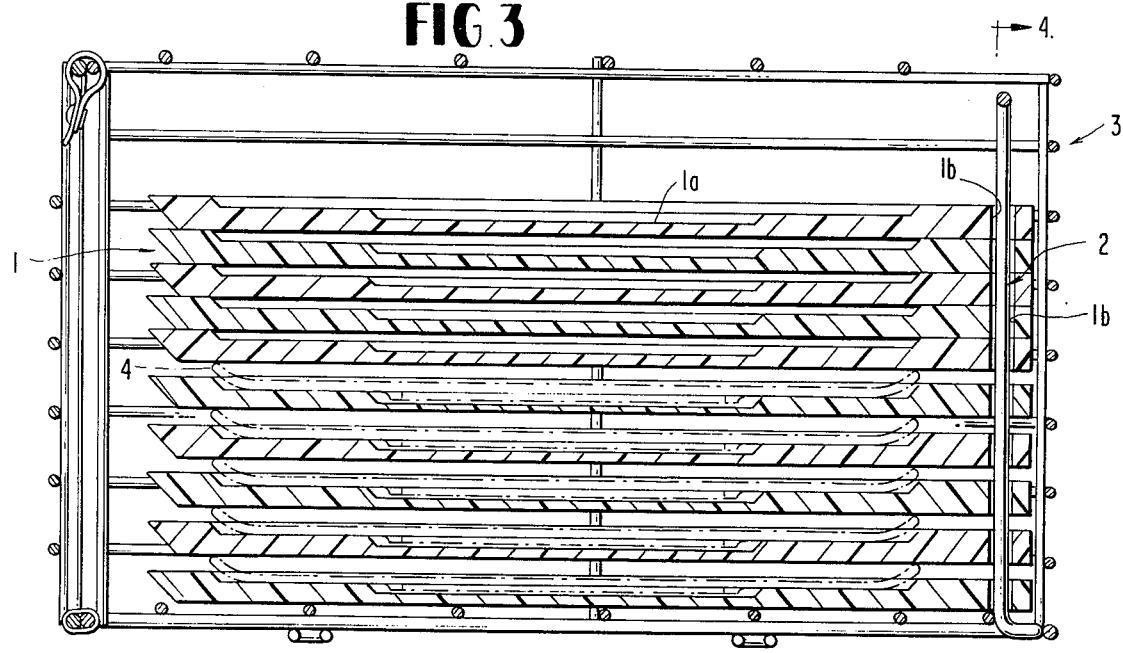
FIG. 3 is a view taken along line 3—3 of FIG. 2.
Figure 2:
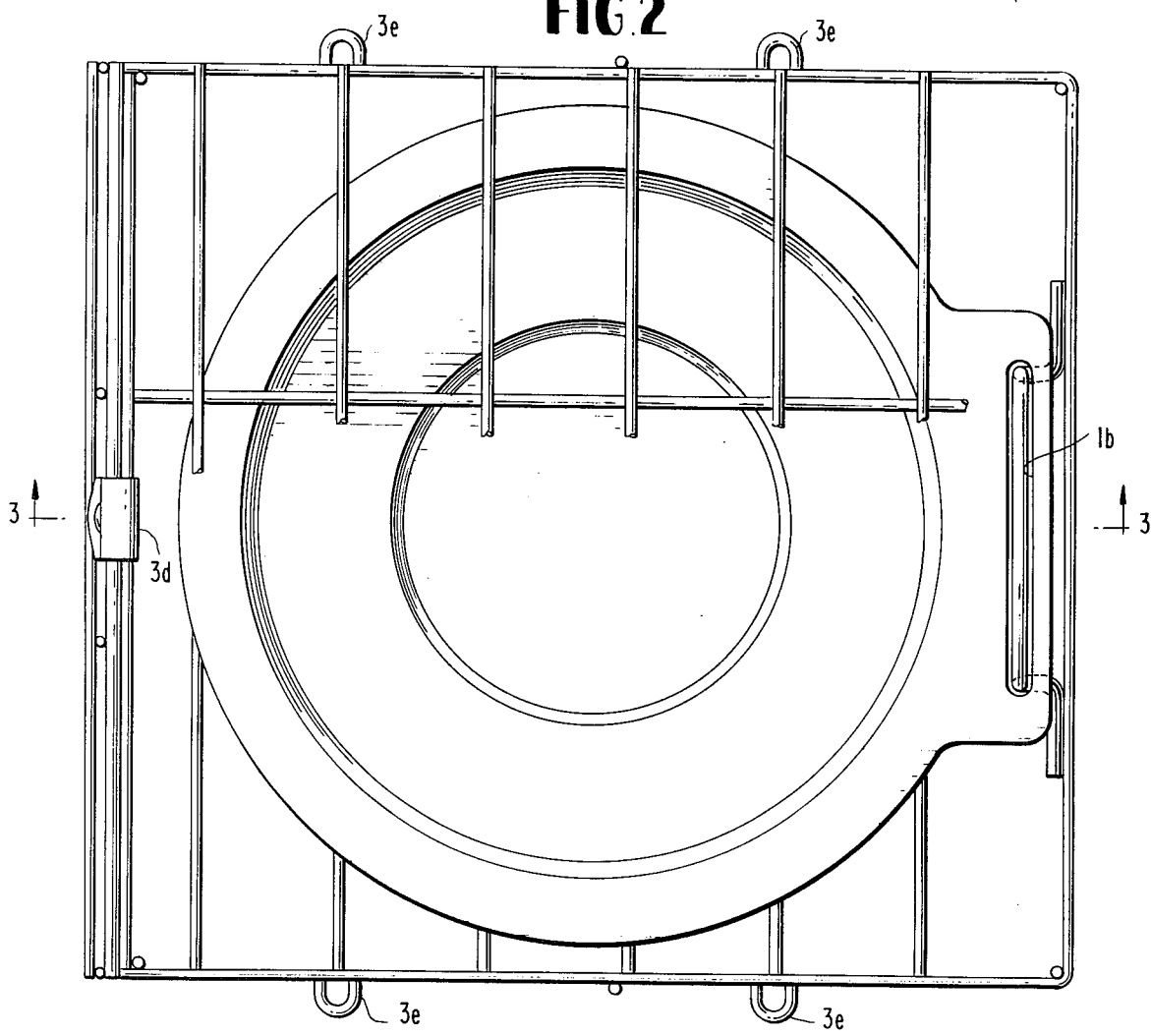
FIG. 2 is a fragmentary, top plan view of the plate holder.

As will be seen in FIG. 3, each carrier is constructed of soft plastic and is formed with a suitable recess 1a in its upper surface for receiving and supporting the bottom surface of a conventional food or dinner plate 4. The carriers are disposed in stacked relationship within the housing 3 and are freely slidable on the support 2 which extends through aligned apertures or elongated slots 1b formed in the carriers.

The support 2 is provided by an inverted U-shaped member 2a, forming a post or column, having a width substantially the length of the carrier slots 1b. The free ends of the U-shaped member are bent and welded or otherwise secured to the bottom of the housing 3, to be described more fully hereinafter, whereby the post is spaced inwardly from the back wall of the housing.

By the construction and arrangement of the carriers 1 and support 2, it will be readily seen that when placing a plate on a respective carrier, the plate is merely inserted between adjacent carriers so that the lower carrier receives the bottom surface of the plate, and the upper carrier rests on the top surface of the plate. Since the carriers are formed from soft plastic, the stacked plates are cushioned or insulated from each other, and the recess formed in each carrier prevents the stacked plates from sliding outwardly from the interleaved position.

To protect the stacked plates from damage from falling objects, and to restrain the plates if they should slide from the carriers, the housing 3 is provided. As will be seen in FIG. 1, the housing is constructed of plastic coated wire 3a welded to form a rectangular housing, the front wall 3b of the housing being hinged at 3c to thereby provide access to the interior of the housing. A snap fastener 3d is also provided to hold the front wall in the closed position. Eyelets 3e are connected at the base of the housing on each side thereof for receiving suitable fasteners whereby the housing can be secured to a supporting surface such as a cupboard.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A plate holder for use in leisure time vehicles such as campers, trailers, and the like, comprising a housing, a vertically disposed post mounted in said housing, a plurality of carriers slidably mounted in stacked relationship on said post, each carrier having an aperture through which said post extends, each carrier adapted to support a respective plate, the plates being interleaved the carriers such that the bottom surface of each plate is supported by the top surface of a carrier and the top surface of each plate supports the bottom surface of the next adjacent carrier, whereby the stacked plates are protected against damage while the vehicle is moving; a side wall of the housing providing an access to the interior of the housing whereby a plate may be removed laterally from the stack while the post retains the carriers within the housing wherein the post being spaced inwardly from a wall of the housing and secured to the base thereof.

2. A plate holder according to claim 1, wherein the carriers are constructed of soft plastic.

3. A plate holder according to claim 1, wherein the top surface of each carrier is formed with a recess for supporting the bottom surface of a conventional dinner plate.

4. A plate holder according to claim 1, wherein said post is formed from an inverted U-shaped member, the aperture in each carrier being formed by an elongated slot having a length substantially equal to the width of the U-shaped member.

5. A plate holder according to claim 1, wherein the housing is constructed of plastic coated wire welded to form a rectangular housing.

6. A plate holder according to claim 5, wherein one wall of the housing is hinged to the base of the housing to thereby provide access to the interior of the housing.

7. A plate holder according to claim 1, wherein fastening means are connected to said housing for securing the housing to a supporting surface.

* * * * *